United States Patent
Matsumoto et al.

[11] Patent Number: 6,134,431
[45] Date of Patent: Oct. 17, 2000

[54] PERSONAL STATION AUTHENTICATION SYSTEM AND AUTHENTICATION METHOD

[75] Inventors: Norihisa Matsumoto, Fujisawa; Masato Hayashi, Kawasaki; Susumu Matsui, Machida; Kazuhisa Tanaka, Sagamihara, all of Japan

[73] Assignee: Hitachi, Ltd., Tokyo, Japan

[21] Appl. No.: 08/943,221

[22] Filed: Oct. 6, 1997

[30] Foreign Application Priority Data

Oct. 7, 1996 [JP] Japan .................................. 8-266105

[51] Int. Cl.$^7$ .................................................. H04Q 7/20
[52] U.S. Cl. ............................................ 455/411; 380/21
[58] Field of Search .............................. 380/21, 23, 25, 380/49, 30; 455/410, 411, 424, 433, 435

[56] References Cited

U.S. PATENT DOCUMENTS

| | | | |
|---|---|---|---|
| 5,222,140 | 6/1993 | Beller | 380/21 |
| 5,237,612 | 8/1993 | Raith | 380/23 |
| 5,299,263 | 3/1994 | Beller | 380/30 |
| 5,303,285 | 4/1994 | Kerihuel | 379/58 |
| 5,384,847 | 1/1995 | Hendrickson | 380/23 |
| 5,390,252 | 2/1995 | Suzuki | 380/23 |
| 5,748,742 | 5/1998 | Tisdale | 380/49 |
| 5,940,512 | 8/1999 | Tomoike | 380/25 |

*Primary Examiner*—Daniel S. Hunter
*Assistant Examiner*—Nick Corsaro
*Attorney, Agent, or Firm*—Antonelli, Terry, Stout & Kraus, LLP

[57] ABSTRACT

A public key cryptosystem is used for the authentication of a personal station (PS) which subscribes for a plurality of radio communication exchange systems. A public key of PS is registered into a public key DB of a public key management device. A private key is registered into PS. When PS moves into a service area of a certain radio communication exchange system, an exchange in that radio communication exchange system requests the public key management device for a public key of PS and makes a check for authentication of PS based on the public key cryptosystem by use of the received public key. Thereafter, when PS moves into a service area of another radio communication exchange system, an exchange in the other radio communication exchange system similarly requests the public key management device for a public key of PS and receives the same public key. The exchange in the other radio communication exchange system makes a check for authentication of PS based on the public key cryptosystem by use of the received public key. In the case where the authentication between each radio communication exchange system and PS results in success, each radio communication exchange system can determine a peculiar authentication key to inform PS of the peculiar authentication key so that the authentication of PS from that time onward is performed using the peculiar authentication key.

24 Claims, 12 Drawing Sheets

FIG. 2

900 KEY TABLE

| PSN (901) | PUBLIC KEY (902) | PECULIAR AUTHEN-TICATION KEY (903) |
|---|---|---|
| PSN 1 | Ko 1 | k 1 |
| PSN 8 | Ko 8 | k 8 |
| ⋮ | ⋮ | ⋮ |

FIG. 3

800 PUBLIC KEY TABLE

| PSN (801) | PUBLIC KEY (802) |
|---|---|
| PSN 1 | Ko 1 |
| PSN 2 | Ko 2 |
| PSN 3 | Ko 3 |
| ⋮ | ⋮ |

| PSN (1001) | PRIVATE KEY (1002) | PECULIAR AUTHEN-TICATION KEY (1003) | PUBLIC KEY (1004) |
|---|---|---|---|
| PSN 1 | Ks 1 | k 1 | K 1 |

FIG. 9

900 KEY TABLE

| PSN | PUBLIC KEY | PECULIAR AUTHEN-TICATION KEY | ENCIPHERED RANDOM NUMBER |
|---|---|---|---|
| PSN 1 | Ko 1 | k 1 | R 1 |
| PSN 8 | Ko 8 | k 8 | R 8 |
| ⋮ | ⋮ | ⋮ | ⋮ |

901 / 902 / 903 / 904

PERSONAL STATION AUTHENTICATION SYSTEM AND AUTHENTICATION METHOD

BACKGROUND OF THE INVENTION

The present invention relates to a personal station authentication system and method in a radio communication exchange system provided with personal or mobile stations (or subscriber stations), cell or base stations for communicating with the personal stations by a radio line, and an exchange connected to the personal stations, and more particularly to such an authentication system and method in the case where the personal station is a subscriber station of a plurality of radio communication exchange systems.

In general, two kinds including a portable telephone and a personal handyphone system (hereinafter referred to as PHS) are known as the personal station. Either kind of portable station can enjoy a telephone service while moving in a public mobile communication network for which that portable station has a subscription.

Recently, there is a proposal in which in a closed area controlled or managed by a radio communication exchange system (for example, private branch exchange) other than the public mobile communication network, a special communication service other than the telephone service by the public mobile communication network is presented for the portable stations. Such a proposal is particularly effective to PHS for which the control or service area of one cell station is narrow.

The PHS employs "Personal Handy Phone System Standard" of the foundation Research & Development Center for Radio Systems (hereinafter referred to as RCRSTD-28) as a radio protocol between a cell station and a personal station and is developed setting a goal with which the same station can be used as a portable telephone in the open and as a cordless telephone at a home or a place of business.

Some approaches have been proposed under such a background. JP-A-6-121370 entitled "Telephone System Provided With Cordless Personal Station" has disclosed a system in which the same personal station can be used in a service area of a plurality of domestic base stations (or cell stations) or a plurality of private branch exchanges. Also, each of JP-A-7-177562 entitled "Cordless Telephone Exchange System" and JP-A-7-212826 entitled "Portable Station Accommodating Method" has disclosed a method in which with an object made for the case where a personal station having a subscription for a public mobile communication network (hereinafter referred to as public subscriber station) is used in a service area of a private branch exchange, not only a telephone service as a mere extension telephone but also a public mobile communication service (that is, location registration, outgoing call, incoming call and so forth for the public mobile communication network) are enabled.

In the system disclosed by the JP-A-6-121370 entitled "Telephone System Provided With Cordless Personal Station", the judgement of a personal station as being a subscriber station for a domestic cell station or a private branch exchange is made in the case where a system ID registered in the domestic cell station or the private branch exchange beforehand and a system ID registered in the personal station coincide with each other. Under such a judgement, a communication in a service area under control of the domestic cell station or the private branch exchange is permitted. Also, the JP-A-6-121370 has disclosed a method in which a system ID is registered into a personal station the system ID of which has not yet been registered in the domestic cell station or the private branch exchange. A system identification code shown by the above-mentioned RCRSTD-28 is used for the system ID herein referred to.

The JP-A-7-177562 entitled "Cordless Telephone Exchange System" has disclosed a method in which the public subscriber station moving to the service area of the private branch exchange informs the private branch exchange of station identification information necessary for a call control from the public mobile communication network or the private branch exchange so that the public communication service through the private branch exchange is presented to the public subscriber station in the service area under control of the private branch exchange.

The JP-A-7-212826 entitled "Portable Station Accommodating Method" has disclosed a first method which makes it possible for the public subscriber station to enjoy the public communication service in the service area of the private branch exchange even if the public subscriber station does not make a preliminary registration of subscription for the private branch exchange. According to the disclosed first method, a public subscriber station makes the registration of station identification information into a private branch exchange when it first makes a request for location registration in a service area of a private branch exchange. Further, an authentication algorithm and an authentication key settled beforehand between the public communication network and the public subscriber station are used to make authentication under relay by the private branch exchange. Thereafter, the location of the public subscriber station in the service area of the private branch exchange is registered as location information into a database of the public communication network. Even if the public subscriber station thus subjected to registration makes a request for location registration again as it moves over cell stations in the area of the private branch exchange, only the location information in the service area controlled by the private branch exchange is updated but no location registration for the public communication network is made. The updating of the location information in the service area of the private branch exchange and the station authentication at the time of outgoing call to the public communication network are effected in accordance with whether or not station identification information transmitted from the public subscriber station to the private branch exchange has already been registered in the private branch exchange.

The JP-A-7-212826 entitled "Portable Station Accommodating Method" has further disclosed a second method in which a public subscriber station makes a subscription registration for a private branch exchange beforehand to acquire an in-branch telephone number. This second method is different from the first method in that even when the public subscriber station first makes a request for location registration in a service area of the private branch exchange, authentication by the private branch exchange is made in accordance with whether or not station identification information has already been registered in the private branch exchange. The updating of the location information in the service area of the private branch exchange and the station authentication at the time of outgoing call to the public communication network are effected in a manner similar to that in the first method, that is, in accordance with whether or not station identification information transmitted from the public subscriber station to the private branch exchange has already been registered in the private branch exchange.

In the existing public PHS, on the other hand, authentication surely made each time a subscriber station makes an outgoing call, an incoming call, a location registration or the like is performed by a method using a cryptographic algorithm based on the conventional cryptosystem, common key cryptosystem, common key cipher or symmetric cipher (hereinafter referred to as authentication algorithm). This authentication method has an improved security level as compared with an authentication method as disclosed by the JP-A-7-212826 in which authentication is performed in accordance with whether or not identification information of a portable station of interest has already been registered.

In the existing public PHS, there is employed the so-called common key cryptosystem. Namely, a set of station identification information and an authentication key and an authentication algorithm are registered in each of a subscriber station and a public communication network beforehand. Each of the station identification information and the authentication key differs for each subscriber station. In operation, authentication-is made prior to the establishment of a communication connection between a personal station and an exchange. A procedure for authentication is as follows. The public communication network generates a random number and transmits the generated random number to the personal station. The personal station enciphers the received random number by use of the authentication algorithm and the authentication key registered in the personal station itself and transmits the result of encipherment to the public communication network. From station identification information of the personal station to be authenticated, the public communication network determines an authentication key which that personal station should have possessed. Independently or separately from the personal station, the public communication network enciphers the same random number by use of the determined authentication key. The public communication network compares this result of encipherment and the result of encipherment received from the personal station. In the case where both the results of encipherment coincide with each other, the authentication key is judged as being the same, thereby resulting in a success in authentication. In the case where the coincidence is not obtained, there results in a failure in authentication so that the public communication service is not presented to the personal station.

In the conventional method in which a special service for a portable station is made in a service area under control of a certain private branch exchange, the following problem is involved. In establishing a connection inclusive of a radio line portion between a certain personal station and an exchange in order to that the personal station makes a location registration, an outgoing call, an incoming call or the like, it is necessary to perform the authentication of the personal station as a subscriber station, for each radio communication exchange system, by use of an authentication algorithm and an authentication key settled beforehand between that radio communication exchange system and that personal station. In this case, the authentication for a station (such as a public subscriber station, in-branch station or the like) having not yet made the subscription for that radio communication exchange system is impossible since such a station has no authentication algorithm and authentication which are settled beforehand.

As a measure to counter such an inconvenience may be considered a method in which in a radio communication exchange system for which a certain personal station has not yet made the subscription, a possessor of the personal station newly makes a subscription contract and an authentication algorithm and an authentication key of the radio communication exchange system under contract with the personal station are registered into the personal station. In this method, however, when there are a plurality of radio communication exchange systems the use of which is desired by the personal station, the authentication algorithm and the authentication key differ for each radio communication exchange system, so far as the common key cryptosystem is employed. Accordingly, it is required that the authentication algorithm and the authentication key corresponding to each radio communication exchange system be stored in the personal or portable station. Therefore, the portable station needs a memory capacity proportional to the number of radio communication exchange systems with which the contract is concluded.

As another countermeasure may be considered a method in which the same authentication algorithm and the same authentication key are applied to one personal station for a plurality of radio communication exchange system. However, if such a simple common use is made, a manager of a certain radio communication exchange system (for example, PBX) in a position capable of knowing the keys of the individual subscriber stations is made able to enjoy a communication service unfairly by using as an individual the key of a subscriber station of another person to give false evidence as being a subscriber station in another radio communication exchange system the manager of which is not himself or herself.

SUMMARY OF THE INVENTION

An object of the present invention is to provide a radio communication exchange system, an exchange, a management device, a personal station and a personal station authentication method in which in a radio communication exchange system provided with a personal station capable of subscribing for a plurality of radio communication exchange systems, the number of authentication algorithms and authentication keys to be registered in the personal station is reduced.

Another object of the present invention is to provide a radio communication exchange system in which a smaller increase in memory capacity of a personal station suffices.

To attain the above object, the present invention employs a public key cryptosystem for the authentication of a personal station. The public key cryptosystem may also be called public key cryptography, public key cipher or asymmetric cipher.

The present invention provides a radio communication exchange system provided with a plurality of personal stations, a cell station for communicating with each of the plurality of personal stations by a radio line and an exchange connected to the cell station, in which the system has a public key management device for managing a predetermined public key in association with predetermined identification information of each of the plurality of personal stations, the exchange includes public key requesting means for requesting the public key management device for a public key corresponding to the identification information and receiving means for receiving the public key transmitted from the public key management device, each of the plurality of personal stations includes private key storing means for storing a private key corresponding to the public key of the personal station, information enciphered or deciphered on the basis of a public key cryptosystem using the public key corresponding to the identification information or the private key is transferred between the exchange and each of the plurality of personal stations, and the exchange authenticates each of the plurality of personal stations by making, on the basis of the transferred information, the judgement of whether or not the public key corresponding to the identification information matches with the private key stored in each of the plurality of personal stations.

In the present invention, the exchange fetches the public key from the public key management device to perform the authentication of the personal station. When the personal station moves into a service area of another radio communication exchange system, too, authentication based on a predetermined public key cryptosystem is similarly performed for the same personal station by use of the same public key and private key. The public key cryptosystem is such that only in the case of the combination of a private key and a public key corresponding thereto, a numeric value enciphered by one of the private key and the public key can be deciphered by the other key. Since a manager of a radio communication exchange system cannot know a private key possessed by the personal station, the manager is unable to unfairly use the personal station as an individual in another radio communication exchange system. Therefore, even in the case where a personal station subscribes for a plurality of radio communication exchange systems, one key (or private key) and one authentication algorithm (or authentication algorithm based on a public key cryptosystem) suffices as what is to be stored in the personal station. Also, since it is not necessary to store an authentication algorithm and a private key which differ for each of the plurality of radio communication exchange systems, a smaller memory capacity of the personal station suffices.

As specific solving means, the exchange further includes authentication means for generating a random number in order to authenticate each of the plurality of personal stations and transmitting the random number to a personal station to be authenticated, each of the plurality of personal stations further includes processing means for enciphering the random number transmitted from the exchange on the basis of the public key cryptosystem by use of the private key stored in the private key storing means and transmitting the enciphered random number as the result of operation to the exchange, and the authentication means deciphers the enciphered random number transmitted from the personal station to be authenticated on the basis of a public key cryptosystem by use of the personal key corresponding to the personal station to be authenticated and authenticates the personal station to be authenticated in the case where the deciphered random number and the generated random number coincide with each other.

As another solving means, the exchange further includes authentication means for generating a random number in order to authenticate each of the plurality of personal stations, enciphering the generated random number on the basis of the public key cryptosystem by use of a public key corresponding to the personal station to be authenticated and transmitting the enciphered random number to the personal station to be authenticated, each of the plurality of personal stations further includes processing means for deciphering the enciphered random number transmitted from the exchange on the basis of the public key cryptosystem by use of the private key stored in the private key storing means and transmitting the deciphered random number as the result of operation to the exchange, and the authentication means authenticates the personal station to be authenticated in the case where the deciphered random number transmitted from the personal station to be authenticated and the generated random number coincide with each other.

The authentication of a personal station is performed when the personal station makes a location registration, an outgoing call and an incoming call. Therefore, it can be constructed such that the above-mentioned authentication is performed at the time of location registration first made when the personal station moves into a radio communication exchange system and authentication from that time onward is performed using a common key cryptosystem (also called conventional cryptosystem, common key cipher or symmetric cipher). In this case, the authentication means generates, after the authentication of the personal station to be authenticated, a peculiar key for the personal station on the basis of a predetermined common key cryptosystem, stores the peculiar key in association with the identification information of the personal station, enciphers the peculiar key on the basis of the public key cryptosystem by use of the public key corresponding to the personal station, transmits the enciphered peculiar key to the personal station, and performs the authentication of the personal station from that time onward on the basis of the common key cryptosystem by use of the peculiar key through communication with the personal station, and the processing means deciphers the enciphered peculiar key transmitted from the authentication means on the basis of the public key cryptosystem by use of the private key stored in the private key storing means, stores the deciphered peculiar key into the private key storing means, and performs an operation for authentication of the personal station through communication with the exchange on the basis of the common key cryptosystem by use of the peculiar key stored in the private key storing means.

As another specific solving means using the public key cryptosystem, the exchange further includes authentication means for generating a peculiar key for the personal station to be authentication on the basis of a predetermined common key cryptosystem, enciphering the generated peculiar key on the basis of the public key cryptosystem by use of the public key corresponding to the personal station to be authenticated, and transmitting the enciphered peculiar key and a generated random number to the personal station to be authenticated, each of the plurality of personal stations further includes processing means for deciphering the enciphered peculiar key transmitted from the exchange on the basis of the public key cryptosystem by use of the private key stored in the private key storing means, enciphering the random number on the basis of the common key cryptosystem by use of the deciphered peculiar key, and transmitting the enciphered random number as the result of operation to the exchange, and the authentication means authenticates the personal station in the case where the enciphered random number transmitted from the personal station to be authenticated and a random number obtained by enciphering the generated random number on the basis of the common key cryptosystem by use of the peculiar key coincide with each other.

According to the present invention, even in the case where one personal station subscribes for a plurality of radio communication exchange systems, a small number of keys (or one key in an extreme case) suffice as authentication keys which are to be registered in that personal station. Also, a smaller increase in memory capacity of the personal station suffices.

BRIEF DESCRIPTION OF THE DRAWINGS

FIG. 2 is a diagram for explaining a key table in the embodiment of the present invention;

FIG. 3 is a diagram for explaining a public key table in the embodiment of the present invention;

FIG. 5 is a diagram for explaining a station information table in the embodiment of the present invention;

FIG. 9 is a diagram for explaining a key table in the second embodiment of the present invention;

DESCRIPTION OF THE PREFERRED EMBODIMENTS

Embodiments of the present invention will now be described in detail.

Figure 1:
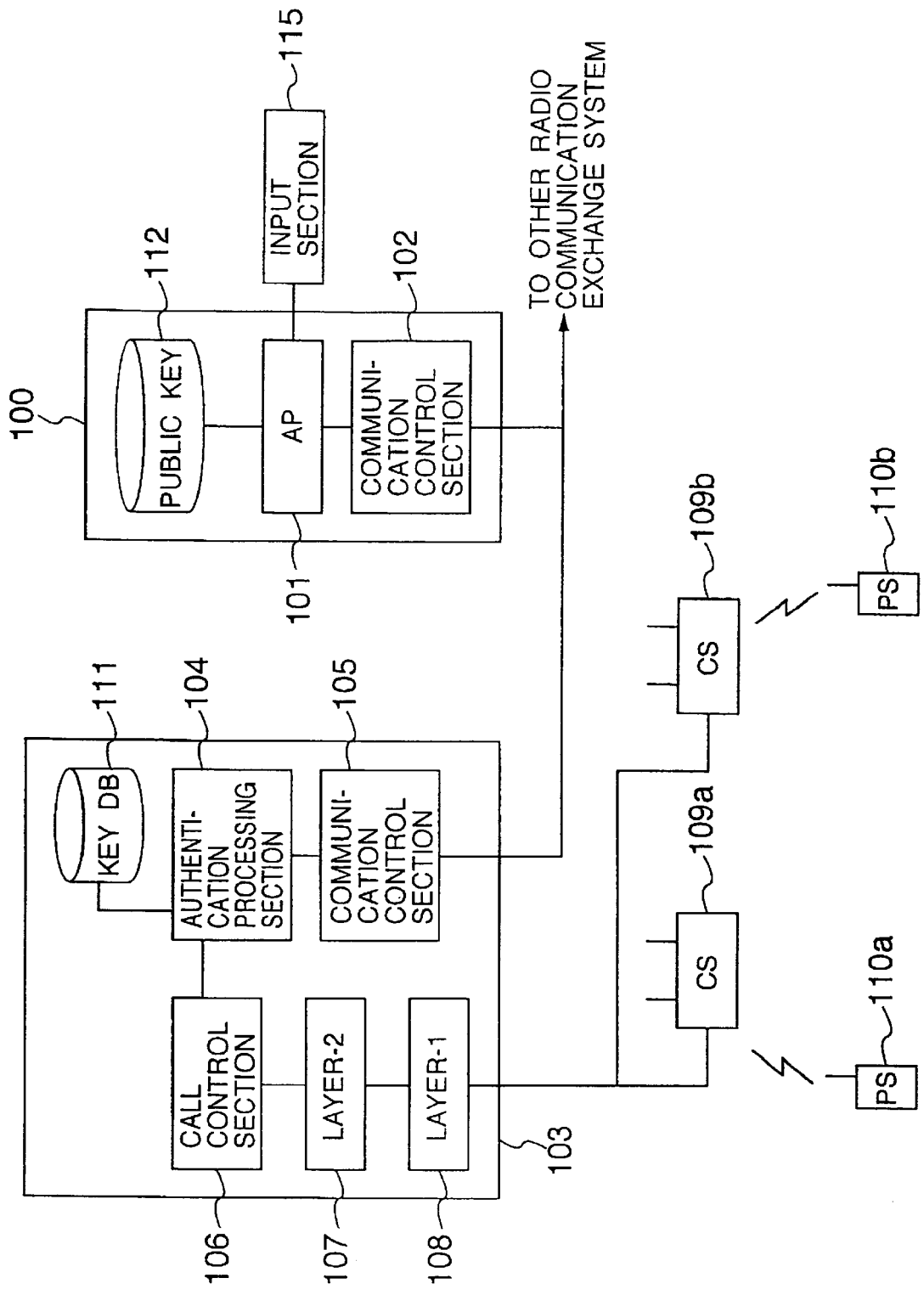
FIG. 1 is a block diagram showing the construction of a radio communication exchange system and a public key management device in an embodiment of the present invention.

FIG. 1 is a diagram showing the outline of a radio communication exchange system and a public key management device to which a first embodiment of the present invention is applied. In FIG. 1, the radio communication exchange system is provided with a plurality of mobile or personal stations (hereinafter referred to as PS) 110a and 110b, base stations or cell stations (hereinafter referred to as CS) 109a and 109b for communicating with each of the plurality of PS's by a radio line, and an exchange 103 connected to the CS's. The radio communication exchange system is further provided with a public key management device 100 for managing a public key based on a predetermined public key cryptosystem in association with predetermined identification information of each of the plural PS's 110. In the following, the personal station PS will be denoted merely by 110 without suffix in the case where either 110a or 110b does well. Similarly, the cell station CS will be denoted merely by 109 without suffix in the case where either 109a or 109b does well.

The exchange 103 includes a layer-1 control section 108 for performing a communication control for a layer 1 of a communication protocol, a layer-2 control section 107 for performing a communication control for a layer 2 of the communication protocol, a call control section 106 for controlling a connection between the PS 110a and the PS 110b, an authentication processing section 104 as authentication means for authenticating the PS 110 by making the transmission/reception for the PS 110 on the basis of the public key cryptosystem by use of the public key, a key DB 111 for storing the public key for each PS 110, and a communication control section 105 for performing a control for communication with the public key management device 100.

The exchange 103 accommodates the PS's 110a and 110b through the plurality of CS's 109a and 109b connected by an electrical communication line to perform a communication control between the PS 110a and the PS 110b. The PS 110a and the PS 110b are connected by a radio line using the RCRSTD-28 protocol in a manner similar to that in the prior art mentioned earlier. The CS 109 and the PBX 103 are connected by, for example, an interface between TTC standard personal handyphone system public cell station digital networks (JT-Q931-b, JT-Q932a). The layer-1 control section 108 of the exchange 103 controls the electric characteristic of the communication line, and the layer-2 control section 107 thereof establishes a data link for the CS 109 by use of communication means provided by the layer-1 control section 108. The call control section 106 establishes an end-end connection between the PS's by use of the data link provided by the layer-2 control section 107. The call control section 106 is also provided with a location managing function of managing location information of the PS 110.

The authentication processing section 104 is provided with an authentication algorithm based on the predetermined public key cryptosystem. When the exchange 103 communicates with the PS 110, the authentication processing section 104 uses the public key stored in the key DB 111 and the public key cryptosystem in accordance with an instruction from the call control section 106 to perform an authentication processing as to whether or not the PS 110 is a subscriber station of this radio communication exchange system. Also, in the case where a public key corresponding to the PS 110 has not yet been stored in the key DB 111, the authentication processing section 104 requests the public key management device 100 for the public key corresponding to the PS 110, receives the public key transmitted from the public key management device 110 and stores the public key corresponding to the PS 110 into the key DB 111.

After the authentication based on the public key cryptosystem, the authentication processing section 104 may generate a peculiar authentication key corresponding to the PS 110 by a common key cryptosystem (also called conventional cryptosystem, common key cipher or symmetric cipher) peculiar to the radio communication exchange system to inform the PS 110 through the call control section 106 and the CS 109 of the generated peculiar authentication key, so that authentication by the authentication processing section 104 from that time onward is performed in accordance with the peculiar common key cryptosystem. This will be explained later on in conjunction with a third embodiment.

The result of authentication at the authentication processing section 104 is transmitted to the call control section 106. On the basis of this, the call control section 106 makes the establishment or release of a connection with the PS 110. The communication control section 105 is provided for allowing the authentication processing section 104 to communicate with the public key management device 100. The communication control section 105 is connected to a communication control section 102 of the public key management device 100 through an electrical communication line such as X25 or the like. The key DB 111 manages the public key of the PS 110 obtained from the public key management device 100 in association with predetermined identification information of the PS (hereinafter referred to as PSN). In the case where not only the authentication based on the public key cryptosystem but also the authentication based on the common key cryptosystem peculiar to the radio communication exchange system and the peculiar key are performed, the key DB 111 further manages the peculiar authentication key.

An example of a key table 900 stored in the key DB 111 is shown in FIG. 2. In the key table 900 are stored a PSN 901, a public key 902 and a peculiar authentication key 903 for each PS 110 in association with each other. The PSN 901 is assigned for each PS 110 which calls on the radio communication exchange system. The public key 902 and the peculiar authentication key 903 are stored corresponding to the PSN 901.

Returning to FIG. 1, the public key management device 100 includes the communication control section 102 for performing a control for communication with the exchange 103, an AP (application) 101 for searching a public key DB 112 to deliver the public key of the PS 110, the public key DB 112 for storing the public key for each PS 110, and an input section 115 for inputting PNS and so forth.

The AP 101 of the public key management device 100 searches the public key DB 112 upon reception of a request from the authentication processing section 104 of the exchange 103 to determine the public key of the PS 110 and transmits the determined public key to the exchange 103 through the communication control section 102.

An example of a public key table 800 stored in the public key DB 112 is shown in FIG. 3. In the public key table 800 there are stored a PSN 801 and a public key 802 corresponding thereto. The PSN 801 and public key 802 for a PS 110 allowed to be used in all radio communication exchange systems connected to the public key management device 100 are registered into the public key table 800 through the input section 115. For example, in the case where there are a plurality of radio communication exchange systems, the assignment of one PSN 801 and one public key 802 suffices for one PS 110 even when the one PS 110 utilizes those radio communication exchange systems. Each radio communication exchange system can acquire the public key 802 corresponding to PSN 801 of the PS 110 by inquiring of the public key management device 100. The public key 802 is settled beforehand for each PS, for example, at the time of contract with a first radio communication exchange system. It is preferable that the public key management device 100 is a facility independent of the plurality of radio communication exchange systems (for example, a service company).

Figure 4:
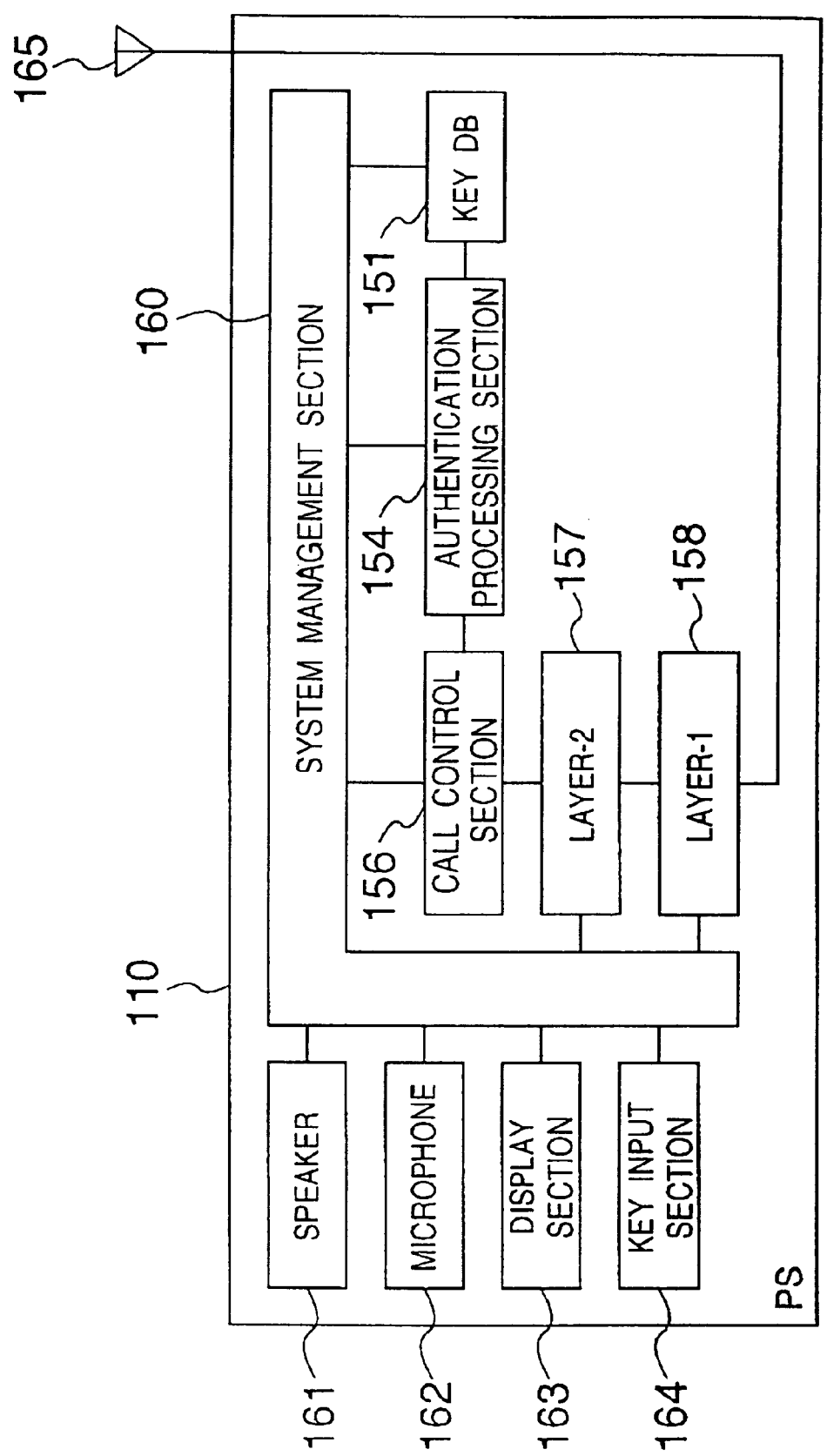
FIG. 4 is a block diagram showing the construction of a personal station in the embodiment of the present invention.

FIG. 4 is a block diagram showing the construction of the PS 110. In FIG. 4, the PS 110 includes a layer control section 158 for performing a communication control for the layer 1 of the communication protocol, a layer-2 control section 157 for performing a communication control for the layer 2 of the communication protocol, a call control section 156 for controlling a connection with the exchange 103 or another PS, a key DB 151 as private key storing means for storing a private key corresponding to the public key, an authentication processing section 154 for performing an authentication processing for authentication of this PS 110 on the basis of the public key cryptosystem by use of the private key stored in the key DB 151, a speaker 161 for outputting a voice, a microphone 162 for inputting a voice, a display section 163 for displaying a telephone number and so forth, a key input section 164 for receiving the input of a telephone number and so forth, and a system management section 160 for performing the control and management of the whole.

In the PS 110, a private key corresponding to the public key 802 registered in the public key DB 112 is stored into the key DB 151 beforehand. An example of a station information table 1000 registered in the key DB 151 is shown in FIG. 5. In the station information table 1000 are stored a PSN 1001 assigned to the PS 110, a private key 1002, a peculiar authentication key 1003 and a public key 1004 in association with each other. The PS 110 is provided with an authentication algorithm based on a predetermined public key cryptosystem. In the case where the PS 110 is requested from the exchange 103 for authentication based on the public key cryptosystem, the PS 110 performs an authentication operation on a random number sent from the exchange 103 by use of the private key 1002 and the public key cryptosystem. The peculiar authentication key 1003 is stored and used in the case where a common key cryptosystem is further used for the authentication of the PS 110. The peculiar authentication key 1003 is one assigned to the PS 110 peculiarly by a radio communication exchange system in which the PS 110 is located at the present point of time. The public key 1004 is necessary in the case where the PS 110 is a subscriber station of a public mobile communication network as well as a subscriber station of a radio communication exchange system. The public key 1004 is used for an authentication operation performed by the public mobile communication network when it makes the authentication of the PS 110.

Figure 6:
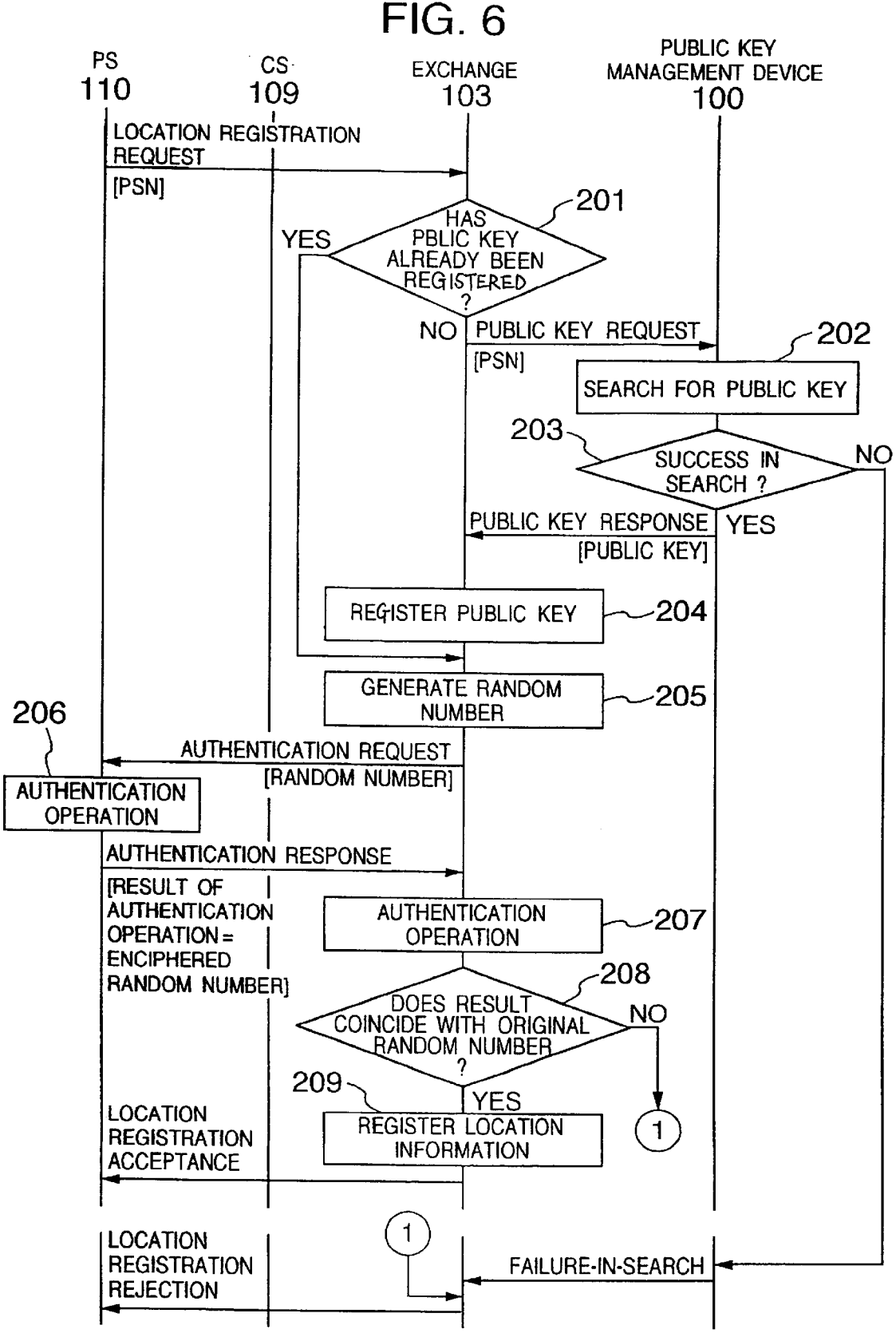
FIG. 6 shows a signal sequence in a first embodiment of the present invention.

Next, description will be made of a sequence in the case where a certain personal station makes a location registration for a certain radio communication exchange system having the construction shown in FIG. 1. The description will be made referring to FIG. 6. FIG. 6 shows a signal sequence when the PS 110 makes a location registration for the exchange 103 of the radio communication exchange system. In the sequence shown in FIG. 6, when a request for location registration is made from the personal station 110, the exchange 103 performs the authentication of the personal station 110 by use of the public key and accepts the location registration after authentication.

Referring to FIG. 6, when the PS 110 detects the movement over radio communication exchange systems by receiving a radio signal of which the PS 110 is periodically informed by the CS 109, the PS 110 transmits a location registration request message inclusive of its own PSN to the exchange 103 through the CS 109. The exchange 103 searches the key table 900 in the key DB 111 to determine whether or not the PS 110 has already been registered (step 201). If the PS 110 has not yet been registered, the exchange 103 transmits a public key request message inclusive of PSN to the public key management device 100. The public key management device 100 receiving the public key request message searches the public key table 800 for a public key corresponding to PSN included in the message (step 202). In the case where the search results in a success (step 203), the public key management device 100 transmits a public key response message inclusive of the PSN and the public key 802 to the exchange 103 which in turn registers the PSN and the public key into the key table 900 (step 204). In step 205, a random number for making the authentication of the PS 110 based on the predetermined public key cryptosystem is generated. The random number is transmitted by means of an authentication request message to the PS 110 through the CS 109.

In the PS 101 receiving the authentication request message, the random number is subjected to an authentication operation in accordance with a predetermined public key cryptosystem algorithm by use of the private key 1002 registered in the station information table 1000 so that it is enciphered as the result of authentication operation (step 206). The PS 110 sets the result of authentication operation into an authentication response message and transmits this message to the exchange 103. The exchange 103 receiving the authentication response message performs an authentication operation by use of the public key 902 registered in the key table 900 for deciphering the received result-of authentication operation in accordance with the public key cryptosystem algorithm (step 207).

According to the public key cryptosystem, only in the case of the combination of a private key and a public key corresponding thereto, a numeric value enciphered by one of the keys can be deciphered by the other key. Therefore, whether or not the private key 1002 stored in the PC 110 and the public key 802 stored in the public key management device 100 correspond each other can be checked by the judgement of whether or not the result of authentication operation obtained in step 207 coincides with the random number generated in step 205. Thereby, the authentication of the PS 110 can be made.

In the case where the result of authentication operation coincides with the original random number (step 208), location information of the PS 110 is registered in the call control section 106 (step 209) and a location registration acceptance message is transmitted to the PS 110 through the CS 109. On the other hand, in the case where it is determined as the result of judgement in step 208 that the result of authentication operation does not coincide with the original random number, the exchange 103 transmits a location registration rejection message to the PS 110 through the CS 109. Also, in the case where it is determined as the result of judgement in step 203 that the public key of the PS 110 is not searched out, the use of the PS 110 in the radio communication exchange system is not allowed and hence the public key management device 100 transmits a failure-in-search message to the exchange 103. The exchange 103 receiving the failure-in-search message transmits a location registration rejection message to the PS 110. Also, in the case where it is determined as the result of judgement in step 201 that the PSN and the public key of the PS 110 have already been registered in the key table 900 of the exchange 103, the flow goes to the random number generating step 205 without making the public key request to the public key management device 100.

When the personal station moves to another radio communication exchange system, too, the above sequence is similarly carried out. Namely, for the same personal station, authentication based on the predetermined public key cryptosystem algorithm is performed using the same public key and private key.

As explained in the foregoing, the first embodiment of the present invention enables authentication based on a public key cryptosystem. Also, in the case where a personal station subscribes for a plurality of radio communication exchange systems, the storage of an algorithm and a private key based on the public key cryptosystem suffices for the authentication of the personal station in the plurality of radio communication exchange systems. Since it is not necessary to store an authentication algorithm and a private key for each radio communication exchange system, a smaller memory capacity of the personal station suffices.

Next, a second embodiment of the present invention will be described. The second embodiment is the same as the first embodiment with respect to the system construction and table structure shown in FIGS. 1 to 5 but is different from the first embodiment with respect to the sequence of authentication operations performed by use of the public key and the private key on a random number generated by the exchange 103.

Figure 7:
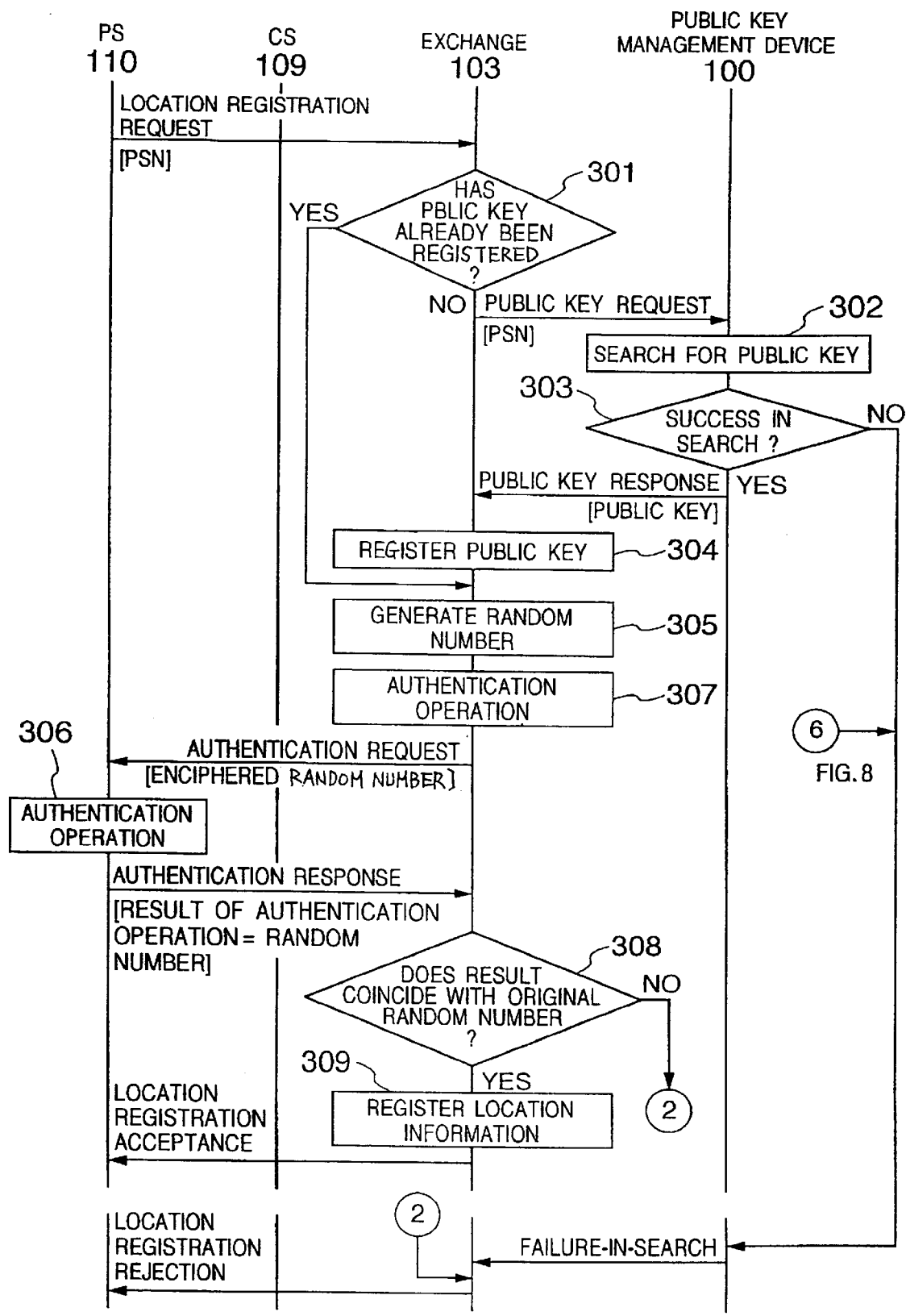
FIG. 7 shows a signal sequence in a second embodiment of the present invention.

FIG. 7 shows a signal sequence in the second embodiment when the PS 110 makes a location registration for the exchange 103 of the radio communication exchange system. A process from step 301 to step 305 in FIG. 7 is performed in a manner similar to that from step 201 to step 205 of the signal sequence shown in FIG. 6.

Next, a random number generated in step 305 is enciphered in the exchange 103 by use of a public key in accordance with an authentication operation algorithm (step 307). The enciphered random number is transmitted as an authentication request message to the PS 110 through the CP 109.

The PS 110 receiving the authentication request message performs an authentication operation on the enciphered random number by use of a private key 1002 registered in the station information table 1000 so that it is deciphered (step 306). The PS 110 sets the deciphered random number as the result of authentication operation into an authentication response message which is in turn transmitted to the exchange 103. The exchange 103 receiving the authentication response message performs authentication by judging whether or not the deciphered random number as the result of authentication operation and the random number generated in step 305 coincide with each other (step 308). The other process is performed in a manner similar to that in the first embodiment.

As explained in the above, it can be constructed such that the encipherment of a random number is performed by the exchange, the decipherment of the random number is performed by the personal station and the comparison of the deciphered random number and the original random number is made by the exchange.

Figure 8:
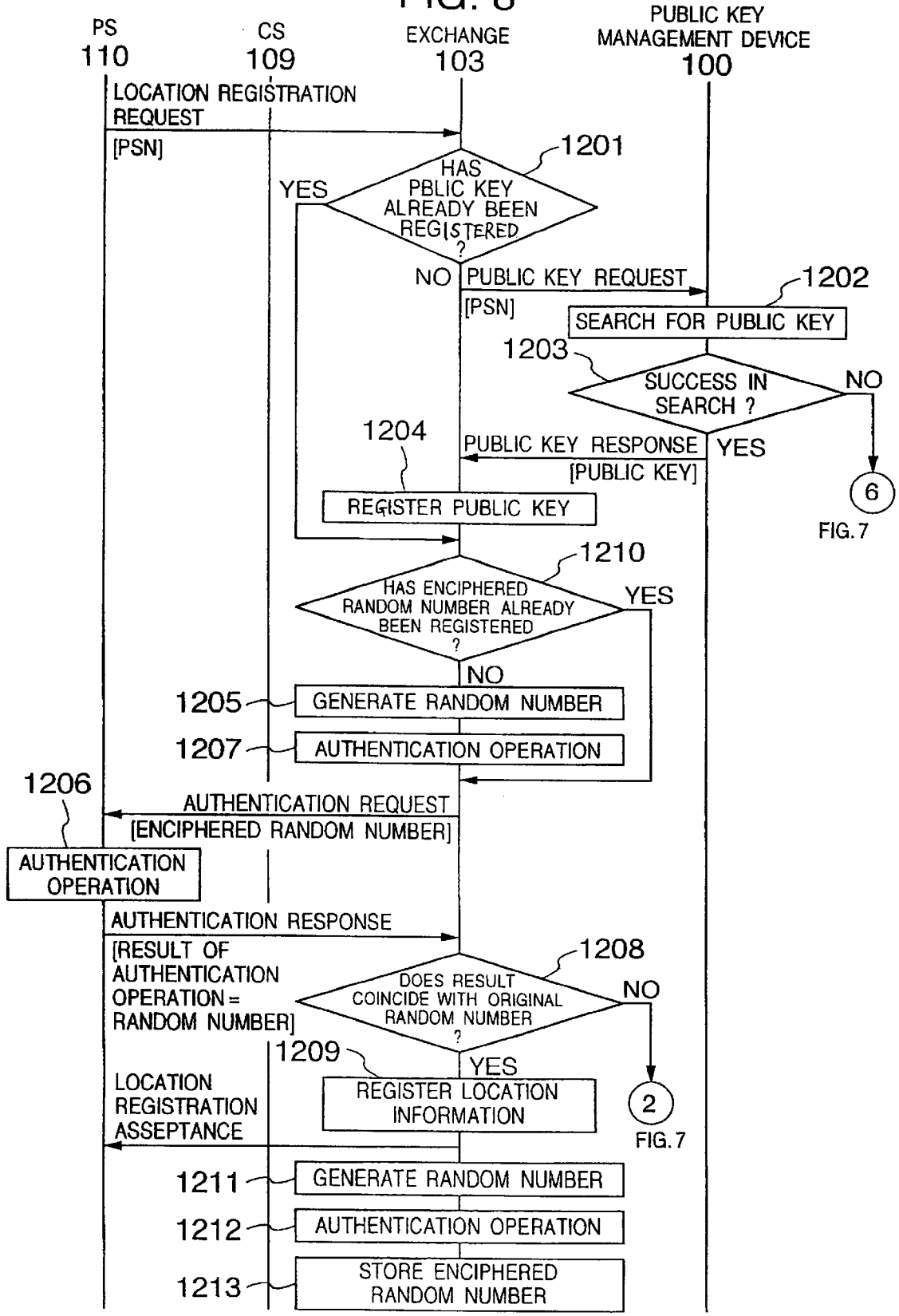
FIG. 8 shows a signal sequence in the case where in the second embodiment of the present invention, a random number is enciphered by a public key beforehand so that the enciphered random number is stored.

In the second embodiment, the authentication operation by the exchange 103 for encipherment of a random number may be performed beforehand prior to the start of communication with the PS 110 so that the enciphered random number is stored in a memory or the like. FIG. 8 shows a signal sequence, in this case, when the PS 110 makes a location registration for the exchange 103 of the radio communication exchange system. In the memory for storing the enciphered random number, the enciphered random number and a PSN are stored in association with each other. For example, as shown in FIG. 9, the enciphered random number may be stored in the above-mentioned key table 900 in association with the PSN 901.

A process from step 1201 to step 1204 in FIG. 8 is performed in a manner similar to that from step 301 to step 304 of the signal sequence shown in FIG. 7. Next or in step 1210, the check is made of whether or not an enciphered random number obtained by enciphering a random number by use of a public key for the PS 110 has already been stored in the key table 900. In the case where the enciphered random number has not yet been stored, a random number is generated (step 1205) to perform an authentication operation (step 1207) and an enciphered random number as the result of authentication operation is set into an authentication request message which is in turn transmitted to the PS 110. On the other hand, in the case where it is determined as the result of check in step 1210 that the enciphered random number has already been stored, the enciphered random number is read. The read random number is set into an authentication request message which is in turn transmitted to the PS 110. After the transmission of a location registration acceptance message to the PS 110 subsequent to a success in authentication in step 1208, the exchange 103 generates another different random number which is to be used for authentication when the exchange 103 communicates with this PS 110 at the next time (step 1211). The generated random number is subjected to an authentication operation (step 1212) and is then stored into a field of the key table 900 for enciphered random number(step 1213).

With such a construction in which the enciphered random number is stored beforehand, authentication can be made in a shorter time since it is not necessary to perform an authentication operation when the authentication is to be made.

In the foregoing, the first and second embodiments have been explained in conjunction with the case where the authentication of the PS 110 is performed on the basis of the public key cryptosystem at all times.

As a third embodiment of the present invention will now be described the case where authentication based on the public key cryptosystem is performed when the PS 110 first makes a location registration for the exchange 103 whereas authentication based on the common key cryptosystem is performed, from that time onward, for a location registration, outgoing call, incoming call or the like.

Figure 10:
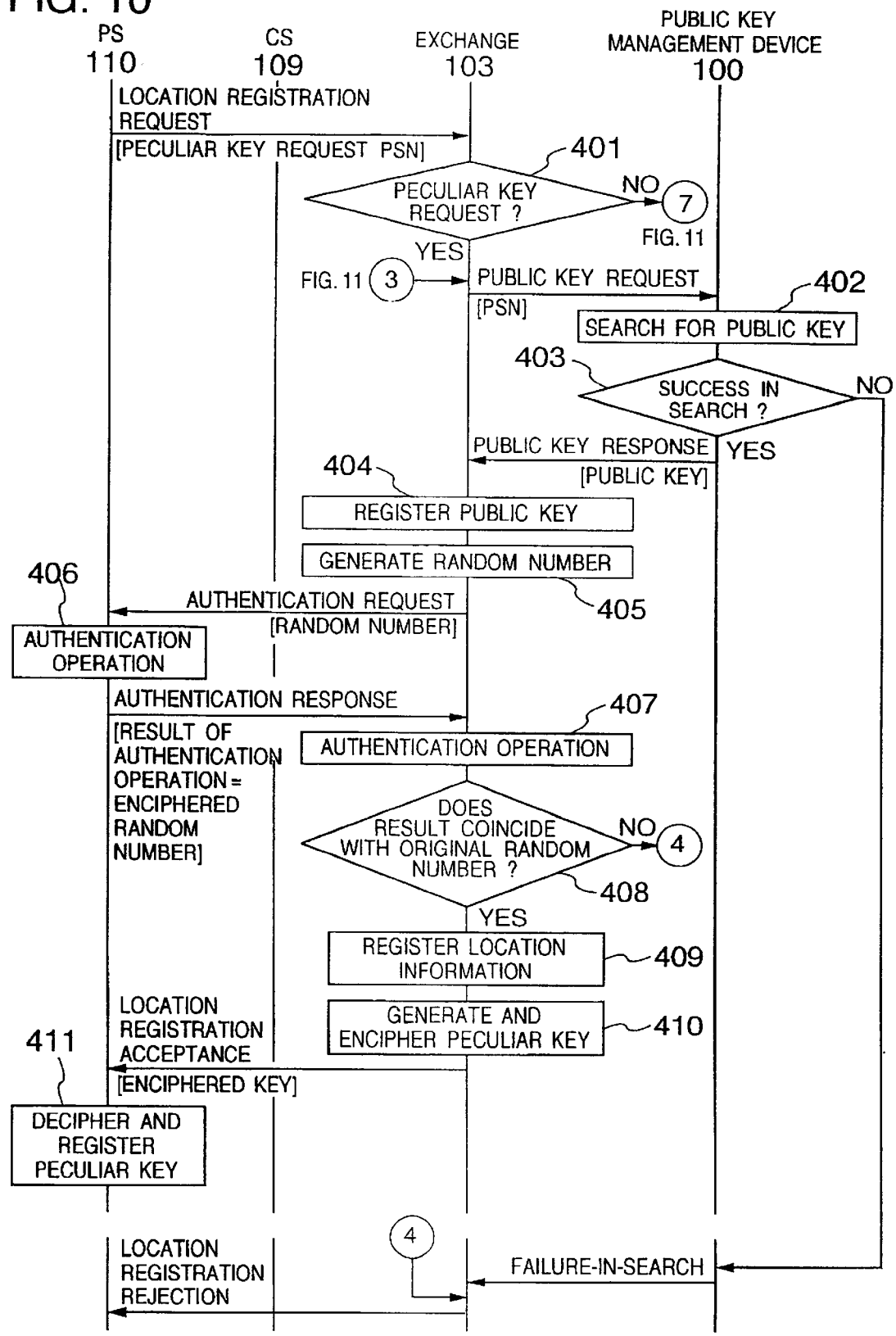
FIG. 10 shows a signal sequence in a third embodiment of the present invention.

FIG. 10 shows a signal sequence in the third embodiment in the case where the PS 110 moves to the service area of the exchange 103 and first makes a location registration for the exchange 103. The third embodiment is the same as the first embodiment with respect to the system construction and table structure shown in FIGS. 1 to 5. In this case, the authentication processing section 104 of the exchange 103 is provided with an encipherment algorithm based on a predetermined common key cryptosystem and the authentication processing section 154 of the PS 110 is provided with the same encipherment algorithm based on the predetermined common key cryptosystem.

Referring to FIG. 10, when the PS 110 detects the movement over radio communication exchange systems by receiving a radio signal of which the PS 110 is periodically informed by the CS 109, a location registration request message including information representative of a peculiar key request and PSN is transmitted from the PS 110 to the exchange 103 through the CS 109. The exchange 103 receiving the location registration request message checks whether or not a request for a peculiar key is made by the PS 110 (step 401). When the peculiar key request is not made, the flow goes to step 502 in FIG. 11 (mentioned later on) since there is the case where the peculiar key has already been registered.

When the peculiar key request is made, it is indicated that the PS 110 first requests the exchange 103 for a location registration. Accordingly, the exchange 103 transmits a public key request message inclusive of PSN to the public key management device 100. The public key management device 100 receiving the public key request message searches the public key table 800 (step 402). In the case where a public key 802 corresponding to PSN of the PS 110 is searched out (step 403), the public key management device 100 informs the exchange 103 of there searched-out public key by means of a public key response message. The exchange 103 receiving the public key response message detects the public key included in the public key response message and registers the detected public key into the key table 900 (step 404). The exchange 103 generates a random number to be used for authentication and transmits the generated random number to the PS 110 by means of an authentication request message (step 405). The PS 110 performs an authentication operation based on a public key cryptosystem by use of the private key 1002 in the station information table 1000 (step 406). The PS 110 informs the exchange.103 of the result of authentication operation by means of an authentication response message.

The exchange 103 performs an authentication operation on the result of authentication operation in the received authentication response message on the basis of the public key cryptosystem using a public key 902 registered in the key table 900 (step 407). In step 408, the check is made of whether or not the result of authentication operation in step 407 and the original random number generated in step 405 coincide with each other. In the case where the coincidence is obtained, location information of the PS 110 in the radio communication exchange system is registered (step 409). Further, the exchange 103 generates a key peculiar to the radio communication exchange system used for authentication based on the common key cryptosystem and registers the generated key into the key table 900 while enciphering the key by the public key 902 (step 410). The exchange 103 informs the PS 110 of the enciphered key by means of a location registration acceptance message. The PS 110 deciphers the enciphered key in the received location registration acceptance message by use of the private 1002 and registers a peculiar authentication key as the result of decipherment into station information table 1000 (step 411).

On the other hand, in the case where it is determined as the result of judgement in step 403 that the PSN and public key of the PS 110 are not searched out, the public key management device 100 informs'the exchange 103 of a failure-in-search message. The exchange 103 receiving the failure-in-search message transmits the PS 110 of a location registration rejection message. Also, in the case where it is determined as the result of check in step 408 that the result of authentication operation by the public key and the original random number do not coincide, the exchange 103 transmits a location registration rejection message to the PS 110.

With the sequence shown in FIG. 10, it can be constructed such that for a location registration first made by the PS 110 for the exchange 103, the authentication based on the public key cryptosystem is performed, and a peculiar key is thereafter enciphered and delivered.

Figure 11:
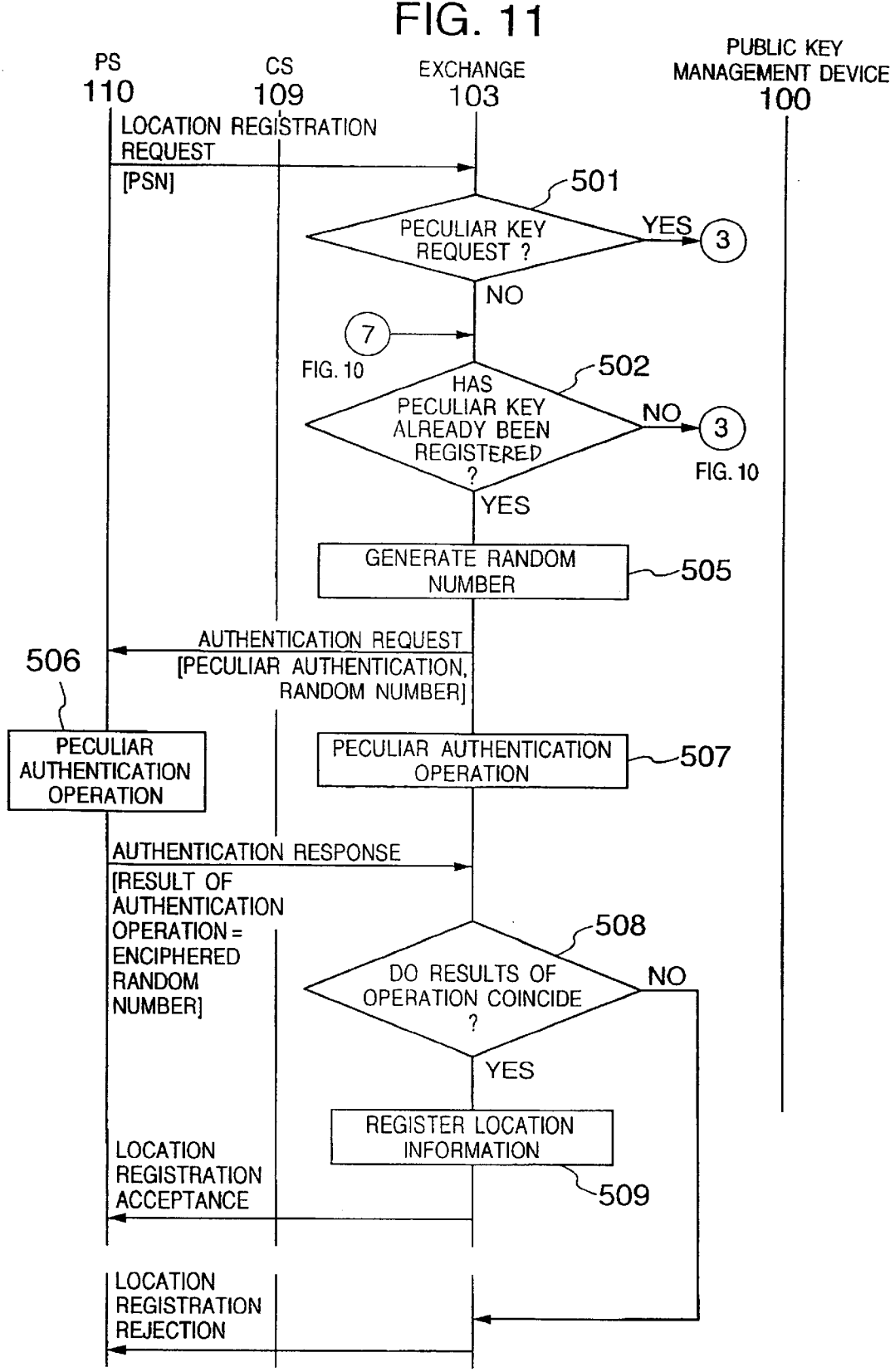
FIG. 11 shows a signal sequence in the case where in the third embodiment of the present invention, the authentication of PS is performed by a peculiar authentication key.

Next, description will be made of a signal sequence in the case where after the location registration by the PS 110 for the radio communication exchange system in accordance with the procedure shown in FIG. 10, authentication based on the common key cryptosystem is performed for a location registration as the PS 110 moves in the same radio communication exchange system. The description will be made referring to FIG. 11. In FIG. 11, the PS 110 transmits a location registration request message to the exchange 103 through the CS 109. Since the case under consideration is the case where the peculiar key has already been registered, the location registration request message in this case does not include information indicative of a peculiar key request, unlike the case shown in FIG. 10. The exchange 103 receiving the location registration request message checks whether or not a request for peculiar key is made by the PS 110 (step 501). In the case where the request for peculiar key is not made, the examination is made of whether or not a peculiar key 903 has already been registered in the key table 900 (step 502). In the case where the peculiar key has already been registered, the exchange 103 generates a random number to be used for authentication and sets the generated random number into an authentication request message which is in turn transmitted to the PS 110 (step 505). The authentication request message includes the random number as well as information indicating that peculiar authentication based on the common key cryptosystem using the peculiar key is requested.

The PS 110 receiving the authentication request message recognizes that the peculiar authentication is requested. Then, the PS 110 performs an authentication operation for enciphering the random number on the basis of the common key cryptosystem by use of a peculiar authentication key 1003 in the station information table 1000 (step 506). The PS 110 sets the result of authentication operation into an authentication response message which is in turn transmitted to the exchange 103. The exchange 103 performs, independently of the PS 110, an authentication operation on the random number generated in step 505 for enciphering the random number on the basis of the conventional cryptosystem by use of the peculiar key 903 having already been in the key table 900 (step 507). The result of authentication operation in step 507 is compared with the result of authentication operation received from the PS 110 (step 508). In the case where both the results coincide with each other, location information of the PS 110 in the radio communication exchange system is registered (step 509) and a location registration acceptance message is transmitted to the PS 110. In the case where it is determined as the result of comparison in step 508 that the result of authentication operation by the exchange 103 and the result of authentication operation by the PS 110 do not coincide, the exchange 103 transmits a location registration rejection message to the PS 110. Also, in each of the case where it is determined as the result of check in step 501 that the request for peculiar key is made and the case where it is determined as the result of examination in step 502 that the peculiar authentication key 903 of the PS 110 has not yet been registered in the key table 900, it is necessary to newly perform authentication based on the public key cryptosystem and hence the authentication is made in accordance with the procedure shown in FIG. 10.

With the third embodiment mentioned above, it can be constructed such that for a location registration first made at the time of movement to a radio communication exchange system, authentication based on the public key cryptosystem is performed, and in the case of a success in authentication, a peculiar key is enciphered by a public key and a PS is informed of the enciphered peculiar key. From that time onward, the use of cipher based on the common key cryptosystem using the peculiar key is possible. In general, a processing time for cipher based on the common key cryptosystem is shorter than a processing time for cipher based on the public key cryptosystem. Accordingly, a time for an authentication processing performed after the first authentication based on the public key cryptosystem can be shortened by performing an authentication processing based on the common key cryptosystem. In this case, a cryptographic algorithm based on the common key cryptosystem is common to all radio communication exchange systems but a peculiar key may differ for each radio communication exchange system. Therefore, a manager of a certain radio communication exchange system is unable to enjoy a communication service unfairly by using as an individual the key of a subscriber station of another person to give false evidence as being a subscriber station in another radio communication exchange system the manager of which is not himself or herself.

Next, a fourth embodiment of the present invention will be described as a method in the case where the authentication based on the public key in the third embodiment is omitted. The description will be made referring to FIGS. 12 and 13. In the fourth embodiment, the authentication based on the public key is omitted since a private key for deciphering a peculiar key enciphered on the basis of the public key cryptosystem is to be naturally possessed by only a PS for which authentication results in success. In other words, since it follows that a PS capable of deciphering a peculiar key enciphered on the basis of the public key cryptosystem possesses a public key, the authentication based on the public key is not necessary.

Figure 12:
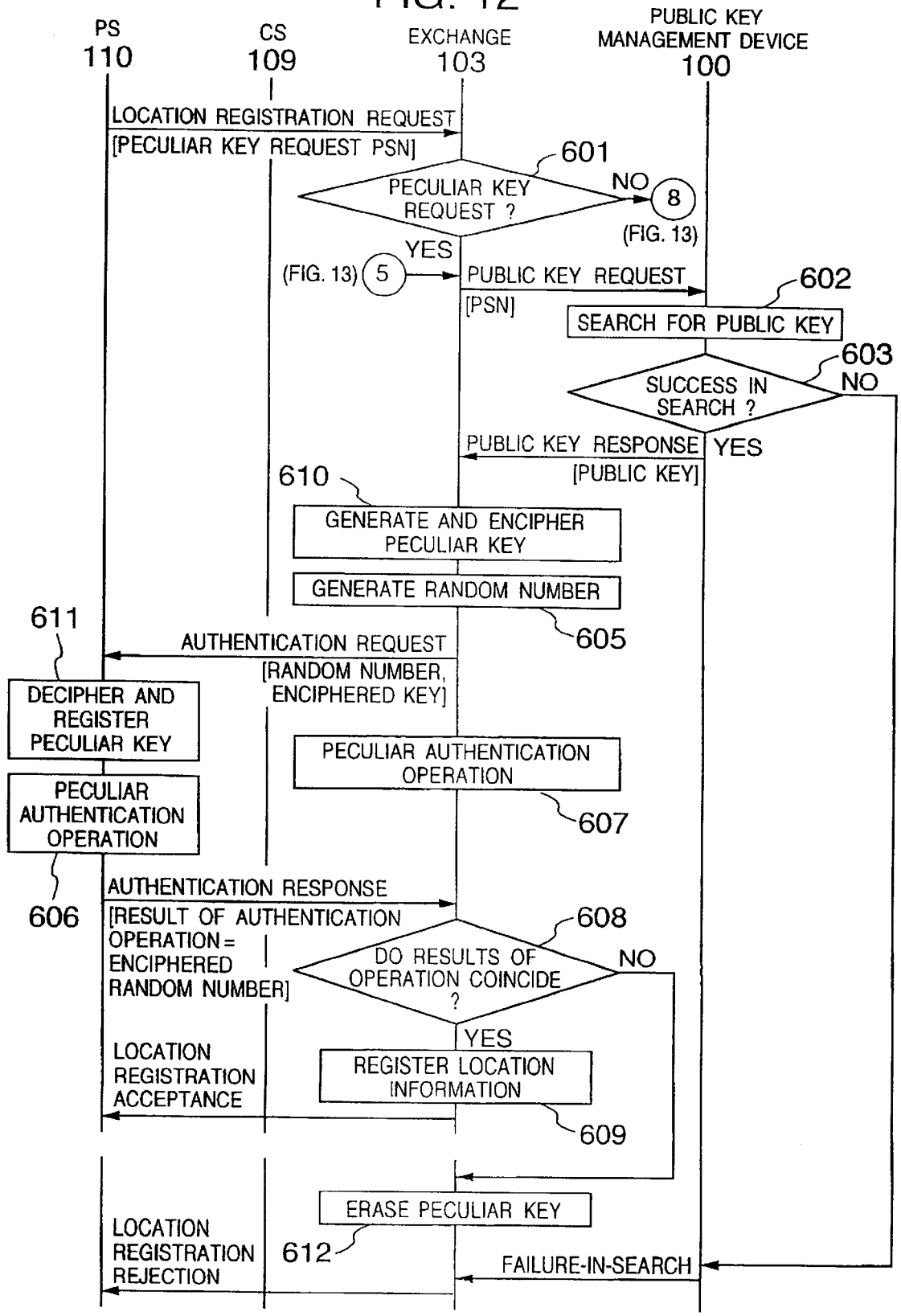
FIG. 12 shows a signal sequence in a fourth embodiment of the present invention.

FIG. 12 shows a signal sequence in the case where the PS 110 moves to the service area of the exchange 103 and first makes a location registration for the exchange 103. Referring to FIG. 12, a location registration request message including information indicative of a peculiar key request and PSN is transmitted from the PS 110 to the exchange 103 through the CS 109. The exchange 103 receiving the location registration request message checks whether or not a request for a peculiar key is made by the PS 110 (step 601). When the peculiar key request is not made, the flow goes to step 702 in FIG. 13 (mentioned later on) since there is the case where the peculiar key has already been registered. When the peculiar key request is made, the exchange 103 transmits a public key request message to the public key management device 100. The public key management device 100 receiving the public key request message searches the public key table 800 on the basis of PSN of the PS 110 included in the public key request message (step 602). In the case where the search for the public key results in success (step 603), the public key management device 100 informs the exchange 103 of the searched-out public key by means of a public key response message. The exchange 103 receiving the public key response message detects the public key included in the public key response message, generates a peculiar key for the PS 110, registers the detected public key and the generated peculiar key into the key table 900, and enciphers the peculiar key by the public key in accordance with an algorithm based on the public key cryptosystem (step 610). The exchange 103 generates a random number for authentication (step 605) and sets the generated random number and the enciphered peculiar key into an authentication request message which is in turn transmitted to the PS 110.

The PS 110 receiving the authentication request message deciphers the peculiar key on the basis of the public key cryptosystem by use of a private key 1002 in the station information table 1000 and stores the result of decipherment as a peculiar authentication key 1003 (step 611). Next, the PS 110 performs an authentication operation on the random number on the basis of the common key cryptosystem by use of the peculiar authentication key 1003 (step 606). The PS 110 sets the enciphered random number as the result of authentication operation into an authentication response message which is in turn transmitted to the exchange 103. The exchange 103 performs an authentication operation on the random number generated in step 605 on the basis of the common key cryptosystem by use of the peculiar key for the PS 110 generated in step 610 (step 607). The exchange 103 compares the result of authentication operation in step 607 and the result of authentication operation received from the PS 110 by the authentication response message (step 608). In the case where the coincidence is obtained, location information of the PS 110 in the radio communication exchange system is registered (step 609) and a location registration acceptance message is transmitted to the PS 110.

On the other hand, in the case where it is determined as the result of comparison in step 608 that both the results of authentication operation do not coincide, the peculiar key is erased from the key table 900 (step 612) and a location registration rejection message is transmitted to the PS 110.

Also, in the case where the search for the public key of the PS 110 in step 602 results in a failure (step 603), the public key management device 100 transmits a failure-in-search message to the exchange 103 which in turn transmits a location registration rejection message to the PS 110.

With the sequence shown in FIG. 12, it can be constructed such that when the PS 110 first makes a location registration for the exchange 103, authentication is performed in such a manner that the exchange enciphers a peculiar key on the basis of the public key cryptosystem and transmits the enciphered peculiar key to the PS 110, the PS 110 enciphers a random number sent from the exchange on the basis of the common key cryptosystem by use of a deciphered peculiar key, and the exchange deciphers the enciphered random number on the basis of the common key cryptosystem by use of a peculiar key and compares the deciphered random number and the random number sent to the PS 110 as to whether or not both the random numbers coincide with each other.

Figure 13:
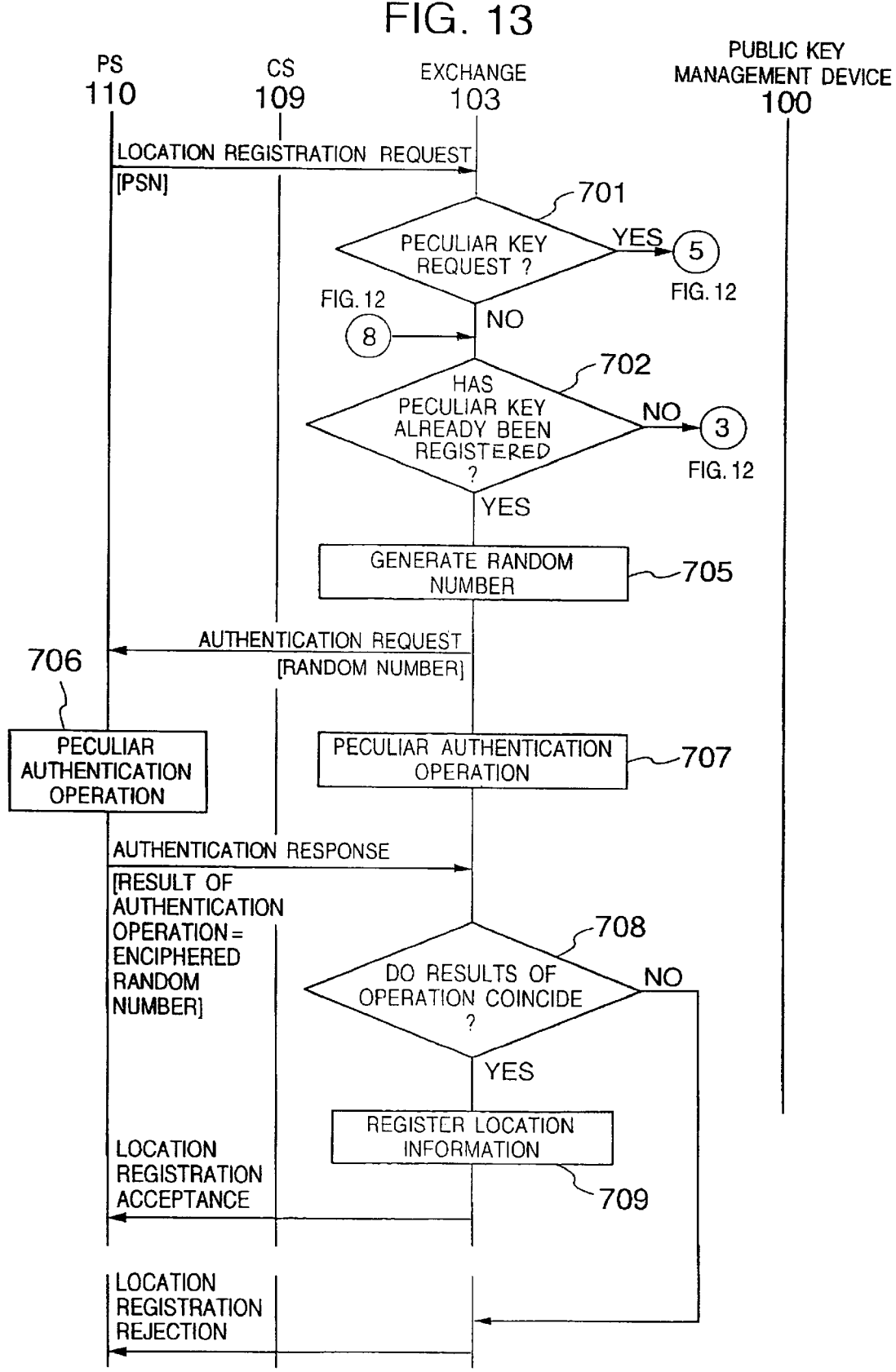
FIG. 13 shows a signal sequence in the case where in the fourth embodiment of the present invention, the authentication of PS is performed by a peculiar authentication key.

Next, description will be made of a signal sequence in the case where after the location registration by the PS 110 for the radio communication exchange system in accordance with the procedure shown in FIG. 12, authentication based on the common key cryptosystem is performed for a location registration as the PS 110 moves in the same radio communication exchange system. The description will be made referring to FIG. 13. In FIG. 13, the PS 110 transmits a location registration request message to the exchange 103 when a location registration becomes necessary. Since the case under consideration is the case where a peculiar key has already been registered, the location registration request message in this case does not include information indicative of a peculiar key request, unlike the case shown in FIG. 12. The exchange 103 receiving the location registration request message checks whether or not a request for a peculiar key is made by the PS 110 (step 701). In the case where the peculiar key request is not made, the key table 900 is searched to make the examination of whether or not a peculiar key 903 has already been registered (step 702). In the case where the peculiar key has already been registered, the exchange 103 generates a random number for authentication and sets the generated random number into an authentication request message which is in turn transmitted to the PS 110 (step 705).

Since an enciphered key is not included in the authentication request message, the PS 110 receiving the authentication request message recognizes that peculiar authentication is requested. Then, the PS 110 performs an authentication operation on the random number on the basis of the common key cryptosystem by use of a peculiar authentication key 1003 in the station information table 1000 (step 706). The PS 110 sets the result of authentication operation into an authentication response message for the exchange 103 and transmits it to the exchange 103. The exchange 103 performs, independently of the PS 110, an authentication operation on the random number generated in step 705 on the basis of the common key cryptosystem by use of the peculiar key 903 in the key table 900 (step 707). The result of authentication operation in step 707 is compared with the result of authentication operation in the authentication response message received from the PS 110 (step 708). In the case where both the results coincide with each other, location information of the PS 110 in the radio communication exchange system is registered (step 709) and a location registration acceptance message is transmitted to the PS 110. In the case where it is determined as the result of comparison in step 708 that both the results of authentication operation do not coincide, the exchange 103 transmits a location registration rejection message to the PS 110. Also, in the case where it is determined as the result of examination in step 702 that the peculiar key of the PS 110 has not yet been registered in the key table 900, the authentication of the PS 110 is performed in accordance with the procedure shown in FIG. 12.

With the fourth embodiment mentioned above, it is possible to omit the authentication based on the public key in the third embodiment.

Figure 14:
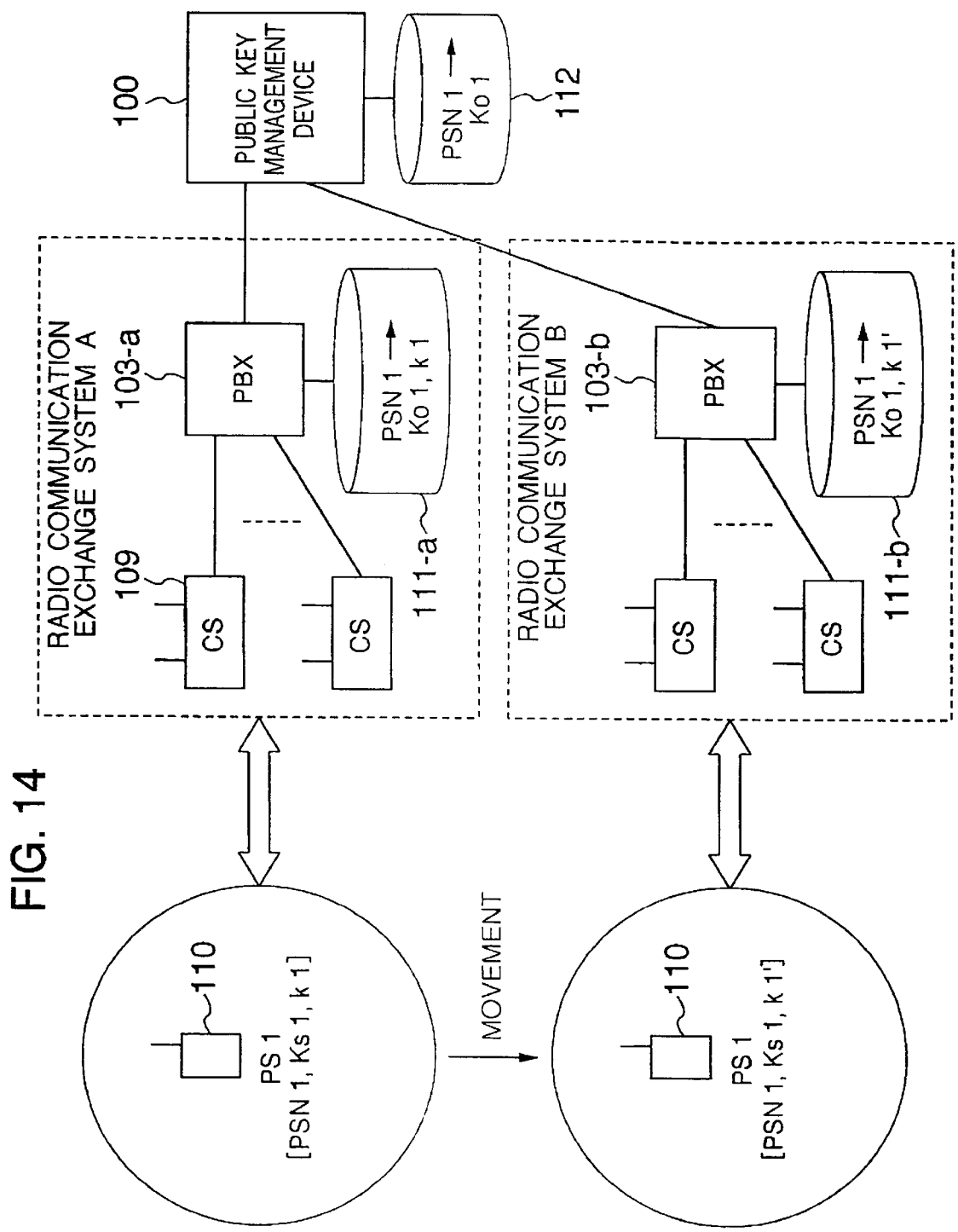
FIG. 14 is an explanatory block diagram showing the construction in the case where in the third and fourth embodiments of the present invention, a plurality of radio communication exchange systems are connected to a public key management device.

Next, description will be made of the situation of management of a public key and a peculiar key in the case where a personal station moves over a plurality of radio communication exchange systems. The description will be made referring to FIG. 14. FIG. 14 shows a block diagram in the third and fourth embodiments of the present invention in the case where the plurality of radio communication exchange systems are connected to the public key management device 100.

In FIG. 14, a radio communication exchange system A and a radio communication exchange system B are connected to the public key management device 100. A personal station PS1 has PSN1 as PSN of PS1 and a private key Ks1 stored therein. Further, when PS1 moves to the radio communication exchange system, a key k1 or k1' peculiar to each radio communication exchange system is stored into PS1 at the same memory position. Also, a public key Ko1 of PS1 is stored in the public key DB 112. The public key Ko1 is also stored into the key DB 111 of the exchange in accordance with the above-mentioned public key request and response.

Referring to FIG. 14, when PSI moves to a service area of the radio communication exchange system A formed by an exchange 103-*a*, the exchange 103-*a* fetches a public key Ko1 of PS1 from the public key management device 100 and registers it into a key DB 111-*a* to perform the authentication of PS1. After a success in authentication, the exchange 103-*a* generates k1 as a peculiar authentication key of PS1, registers k1 into the key DB 111-*a*, and informs PS1 of k1. From that time onward, PS1 holds the peculiar authentication key k1 stored in the station information table 1000, so far as PS1 does not move to the outside of the service area of the exchange 103-*a*. When a need for authentication of PS1 is generated, the exchange 103-*a* performs the. authentication by use of the peculiar authentication key k1 without relying upon the public key management device 100.

Next, when PS1 moves to a service area of the radio communication exchange system B formed by an exchange 103-*b*, the exchange 103-*b* fetches the public key Ko1 of PS1 from the public key management device 100 and registers it into a key DB 111-*b* to perform the authentication of PS1. After a success in authentication, the exchange 103-*b* generates k1' as a peculiar authentication key of PS1, registers k1' into the key DB 111-*b*, and informs PS1 of k1'. Thus, PS1 has the peculiar authentication key k1' in lieu of k1 stored in the station information table 1000 until that time. From that time onward, PS1 continues to store the peculiar authentication key k1' in the station information table 1000, so far as PS1 does not move to the outside of the service area of the exchange 103-*b*. When a need for authentication of PS1 is generated, the exchange 103-*b* performs the authentication by use of the peculiar authentication key k1' without relying upon the public key management device 100.

In the case where authentication based on the public key cryptosystem is always performed without authentication based on the common key cryptosystem, as shown in the first and second embodiments, it is not necessary to store the peculiar key k1 or k1' of the radio communication exchange system and the authentication can be performed always by use of a set of Ko1 and Ks1.

According to the first to fourth embodiments mentioned above, the authentication of a PS is performed fetching a public key from public key management means provided outside of a radio communication exchange system. Thereby, the storage of one (private) key in the PS suffices even in the case where the PS subscribes for a plurality of radio communication exchange systems. Also, even in a system in which an authentication key peculiar to a radio communication exchange system is assigned to the PS after authentication based on a public key cryptosystem so that authentication is performed by use of the peculiar authentication key from that time onward, what is to be stored in the PS is only the private key and the peculiar authentication key for the radio communication exchange system in which the PS is located. Further, since a manager of a radio communication exchange system cannot know a private key which a PS possesses, the manager cannot fabricate a PS which is capable of being unfairly used in another radio communication exchange system.

What is claimed is:

1. A radio communication exchange system managing a closed service area, and comprising at least one cell station for communicating with each of a plurality of personal stations entering said closed service area by a radio line and an exchange connected to said cell station, in which:

each of said plurality of personal stations includes identification information storing means for storing predetermined identification information of said each personal station, and private key storing means for storing a private key defined inherent to said each personal station in a public key cryptosystem, said exchange includes public key requesting means by which, when a personal station enters said closed service area, a public key management device for storing and managing a public key as a counterpart key of a private key in said public key cryptosystem in association with said identification information of each of said plurality of personal stations is requested for a public key of said personal station thus entering, and receiving means for receiving said public key of said entering personal station from said public key management device, and information obtained by enciphering or deciphering information for authentication based on said public key received by said exchange and said private key stored in said entering personal station is transferred between said exchange and said entering personal, and said exchange authenticates said entering personal station by making, on the basis of said transferred information, judgement as to consistency between said public key received by said exchange and said private key stored in said entering personal station.

2. A radio communication exchange system according to claim 1, wherein:

said exchange further includes authentication means for generating a random number as said information for authentication and transmitting the generated random number to said entering personal station, each of said plurality of personal stations further includes processing means for enciphering the random number transmitted from said exchange on the basis of said public key cryptosystem by use of the private key stored in said private key storing means and transmitting the enciphered random number as the result of operation to said exchange, and said authentication means deciphers the enciphered random number transmitted from said entering personal station on the basis of said public key cryptosystem by use of a personal key corresponding to said entering public station and authenticates said entering personal station when the deciphered random number corresponds to the generated random number.

3. A radio communication exchange system according to claim 1, wherein:

said exchange further includes authentication means for generating a random number as said information for authentication, enciphering the generated random number on the basis of said public key cryptosystem by use of a public key corresponding to said entering personal station and transmitting the enciphered random number to said entering personal station, each of said plurality of personal stations further includes processing means for deciphering the enciphered random number transmitted from said exchange on the basis of said public key cryptosystem by use of the private key stored in said private key storing means and transmitting the deciphered random number as the result of operation to said exchange, and said authentication means authenticates said entering personal station when the deciphered random number transmitted from said personal station to be authenticated corresponds to the generated random number.

4. A radio communication exchange system according to claim 3, wherein said authentication means performs the encipherment of the random number for each of said plurality of personal stations in advance, and having storing means for storing the enciphered random number in association with the identification information of each of said plurality of personal stations.

5. A radio communication exchange system according to claim 2, wherein:

said authentication means generates, after the authentication of said entering personal station, a peculiar key for said personal station on the basis of a predetermined common key cryptosystem, stores said peculiar key in association with the identification information of said entering personal station, enciphers said peculiar key on the basis of said public key cryptosystem by use of the public key corresponding to said entering personal station, transmits the enciphered peculiar key to said entering personal station, and performs the authentication of said entering personal station from that time onward on the basis of said common key cryptosystem by use of said peculiar key through communication with said entering personal station, and said processing means deciphers the enciphered peculiar key transmitted from said authentication means on the basis of said public key cryptosystem by use of the private key stored in said private key storing means, stores the deciphered peculiar key into said private key storing means, and performs an operation for authentication of said entering personal station through communication with said exchange on the basis of said common key cryptosystem by use of the peculiar key stored in said private key storing means.

6. A radio communication exchange system according to claim 3, wherein:

said authentication means generates, after the authentication of said entering personal station, a peculiar key for said entering personal station on the basis of a predetermined common key cryptosystem, stores said peculiar key in association with the identification information of said personal station, enciphers said peculiar key on the basis of said public key cryptosystem by use of the public key corresponding to said entering personal station, transmits the enciphered peculiar key to said entering personal station, and performs the authentication of said entering personal station from that time onward on the basis of said common key cryptosystem by use of said peculiar key through communication with said entering personal station, and said processing means deciphers the enciphered peculiar key transmitted from said authentication means on the basis of said public key cryptosystem by use of the private key stored in said private key storing means, stores the deciphered peculiar key into said private key storing means, and performs an operation for authentication of said entering personal station through communication with said exchange on the basis of said common key cryptosystem by use of the peculiar key stored in said private key storing means.

7. A radio communication exchange system according to claim 1, wherein:

said exchange further includes authentication means for generating a peculiar key for said entering personal station on the basis of a predetermined common key cryptosystem, enciphering the generated peculiar key on the basis of said public key cryptosystem by use of the public key corresponding to said entering personal station, and transmitting the enciphered peculiar key and a generated random number to said entering personal station, each of said plurality of personal stations further includes processing means for deciphering the enciphered peculiar key transmitted from said exchange on the basis of said public key cryptosystem by use of the private key stored in said private key storing means, enciphering said random number on the basis of said common key cryptosystem by use of the deciphered peculiar key, and transmitting the enciphered random number as the result of operation to said exchange, and said authentication means authenticates said entering personal station when the enciphered random number transmitted from said entering personal station corresponds to a random number obtained by enciphering said generated random number on the basis of said common key cryptosystem by use of said peculiar key.

8. A radio communication exchange system according to claim 1, wherein said exchange further includes storing means in which said public key received by said receiving means corresponding to said identification information is stored in association with said identification information, and said exchange performs said authentication by referring to said storing means to acquire said public key corresponding to said identification information.

9. An exchange in a radio communication exchange system managing a closed service area, and comprising a cell station connected to said exchange for communicating with each of a plurality of personal stations entering said closed service area by a radio line, and a public key management device for managing a predetermined public key in association with predetermined identification information of each of said plurality of personal stations, each of said plurality of personal stations storing a private key, said exchange comprising:

public key requesting means responsive to entrance of a personal station within said closed service area, for requesting said public key management device for a public key corresponding to identification information of said personal station thus entering; and receiving means for receiving said public key transmitted from said public key management device, in which information obtained by enciphering or deciphering information for authentication on the basis of said public key received by said exchange and said private key stored in said entering personal station is transferred between said exchange and said entering personal station, and said exchange authenticates said entering personal station by making, on the basis of said transferred information, judgement as to consistency between said public key received by said exchange and said private key stored in said entering personal station.

10. A public key management device in a radio communication exchange system managing a closed service area, and comprising an exchange connected to a cell station for communicating with each of a plurality of personal stations entering said closed service area by a radio line, said public key management device comprising:

storing means for storing a predetermined public key in association with predetermined identification information of each of said plurality of personal stations; and transmitting means for making, when a request for a public key corresponding to the identification information of each of said plurality of personal stations, a search of said storing means to acquire a public key corresponding to said identification information and transmitting the acquired public key.

11. A personal station in a radio communication exchange system managing a closed service area, and comprising a cell station for communicating with said personal station by a radio line when said personal station enters said closed service area, and an exchange connected to said cell station, said personal station comprising:

private key storing means for storing a private key of said personal station corresponding to a counterpart public key held in said exchange;

processing means for performing authentication of said personal station on the basis of a predetermined public key cryptosystem by use of said private key stored in said private key storing means; and communicating means for communicating with said exchange to transfer therebetween information obtained by enciphering or deciphering information for authentication on the basis of said public key held in said exchange and said private key stored in said personal station.

12. A personal station authentication method in an exchange in a radio communication exchange system managing a closed service area and a plurality of personal stations, and comprising a cell station for communicating with each of said plurality of personal stations entering said closed service area by a radio line, an exchange connected to said cell station, and a public key management device for managing a predetermined public key in association with predetermined identification information of each of said plurality of personal stations, each of said plurality of personal stations storing a private key, said method comprising the steps of:

- requesting, when a personal station enters said closed service area, said public key management device for a public key corresponding to said identification information of said personal station thus entering;
- receiving said public key transmitted from said public key management device to said exchange;
- transferring information between said exchange and said entering personal station, which information is obtained by enciphering or deciphering information for authentication on the basis of said public key received by said exchange and said private key stored in said entering personal station; and
- making, on the basis of said transferred information, judgement as to consistency between said public key received by said exchange and said private key stored in said entering personal station to authenticate said entering personal station.

13. An authentication system for personal station authentication performed between a plurality of personal stations and at least one radio communication exchange system managing a respective closed service area, in which:

- each of said plurality of personal stations includes identification information storing means for storing predetermined identification information of said each personal station, and private key storing means for storing a private key defined inherent to said each personal station in a public key cryptosystem,
- said authentication system includes a public key management device for storing and managing a public key as a counterpart key of a private key in said public key cryptosystem in association with each of said plurality of personal stations,
- said radio communication system includes at least one cell station for communicating with each of said plurality of personal stations entering said closed service area by a radio line and an exchange connected to said cell station, and
- when a personal station enters said closed service area, said exchange transmits information for authentication to said personal station thus entering, said entering personal station performs an authentication operation on the basis of said private key stored in said entering personal station and transmits a result of said authentication operation to said exchange, and said exchange judges validity of the received result to authenticate registration of said entering personal station on the basis of consistency between said public key received by said exchange and said private key stored in said entering personal station.

14. An authentication system according to claim 13, wherein said information for authentication includes a random number generated by said exchange, and said entering personal station enciphers the generated random number on the basis of said public key cryptosystem by use of said private key and transmits the enciphered random number to said exchange, and said exchange performs the authentication by judging whether the enciphered random number received from said entering personal station coincides with the result of the encipherment of the generated random number which is made in said exchange on the basis of said public key cryptosystem by use of said public key.

15. An authentication system according to claim 13, wherein said information for authentication includes a random number enciphered in said exchange on the basis of said public key cryptosystem by use of said public key, and said entering personal station deciphers the enciphered random number on the basis of said public key cryptosystem by use of said private key and transmits the deciphered random number to said exchange, and said exchange performs the authentication by judging whether said deciphered random number received from said entering personal station coincides with said random number.

16. An authentication system according to claim 13, wherein said information for authentication includes a random number and a peculiar key enciphered in said exchange on the basis of said public key cryptosystem by use of said public key, and said entering personal station deciphers the enciphered peculiar key on the basis of said public key cryptosystem by use of said private key, enciphers the random number on the basis of a predetermined common key cryptosystem by use of the deciphered peculiar key and transmits the enciphered random number to said exchange, and said exchange performs the authentication by judging whether said enciphered random number received from said entering personal station to be authenticated coincides with the result of the encipherment of said random number which is made in said exchange on the basis of said common key cryptosystem by use of said peculiar key.

17. An authentication system according to claim 13, wherein after the authentication in said exchange using said public key, said exchange enciphers a peculiar key for use based on a common key cryptosystem in accordance with said public key cryptosystem by use of said public key and transmits a random number and the enciphered peculiar key to said entering personal station, said entering personal station deciphers said enciphered peculiar key on the basis of said public key cryptosystem by use of said private key, enciphers said random number on the basis of said predetermined common key cryptosystem by use of the deciphered peculiar key and transmits the enciphered random number to said exchange, and said exchange performs the authentication by judging whether said enciphered random number received from said entering personal station coincides with the result of the encipherment of said random number which is made in said exchange on the basis of said common key cryptosystem by use of said peculiar key.

18. An authentication system according to claim 16, wherein first and second radio communication exchange systems each managing respectively first and second closed service areas are provided as said at least one radio communication exchange system, said entering personal station has a peculiar key storing means at which said peculiar key is to be stored, and said entering personal station stores a peculiar key of said first radio communication exchange system at said peculiar key storing position when said entering personal station enters said first closed service area and is authenticated by said first radio communication exchange system, and said entering personal station stores a peculiar key of said second radio communication exchange system at said peculiar key storing position when said entering personal station moves from said first closed service area to said second closed service area and is authenticated by said second radio communication exchange system.

19. An authentication system according to claim 17, wherein said at least one radio communication exchange system includes first and second radio communication exchange systems, said entering personal station has a peculiar key storing position at which said peculiar key is to be stored, and said entering personal station stores a peculiar key of said first radio communication exchange system at said peculiar key storing position when said entering personal station is authenticated by said first radio communication exchange system and stores a peculiar key of said second radio communication exchange system at said peculiar key storing position when said entering personal station moves to said second radio communication exchange system and is authenticated by said radio communication exchange system.

20. An authentication system according to claim 13, wherein said exchange comprises:

public key requesting means responsive to entrance of a personal station within said closed service area, for requesting said public key management device for a public key corresponding to identification information of said personal station thus entering; and receiving means for receiving said public key transmitted from said public key management device, in which information obtained by enciphering or deciphering information for authentication on the basis of said public key received by said exchange and said private key stored in said entering personal station is transferred between said exchange and said entering personal station, and said exchange authenticates said entering personal station by making, on the basis of said transferred information, judgement as to consistency between said public key received by said exchange and said private key stored in said entering personal station.

21. An authentication system according to claim 20, wherein said public key management device comprises:

storing means for storing a public key in association with predetermined identification information of each of said plurality of personal stations; and transmitting means for making, when a request for a public key corresponding to the identification information of each of said plurality of personal stations, a search of said storing means to acquire a public key corresponding to said identification information and transmitting the acquired public key to said exchange.

22. An authentication system according to claim 20, wherein said entering personal station comprises:

private key storing means for storing a private key of said entering personal station corresponding to a counterpart public key held in said exchange;

processing means for performing authentication of said entering personal station on the basis of a predetermined public key cryptosystem by use of said private key stored in said private key storing means; and communicating means for communicating with said exchange to transfer therebetween information obtained by enciphering or deciphering information for authentication on the basis of said public key held in said exchange and said private key stored in said entering personal station.

23. A radio communication exchange system according to claim 1, wherein said public key management device comprises:

storing means for storing a public key in association with predetermined identification information of each of said plurality of personal stations; and transmitting means for making, when a request for a public key corresponding to the identification information of each of said plurality of personal stations, a search of said storing means to acquire a public key corresponding to said identification information and transmitting the acquired public key to said exchange.

24. An authentication system according to claim 20, wherein said entering personal station further comprises communicating means for communicating with said exchange to transfer therebetween information obtained by enciphering or deciphering information for authentication on the basis of said public key held in said exchange and said private key stored in said entering personal station.

* * * * *